United States Patent
Calvano et al.

(10) Patent No.: US 11,620,119 B2
(45) Date of Patent: Apr. 4, 2023

(54) FUNCTION SUMMARIZATION VIA TYPE INFERENCE

(71) Applicant: RAYTHEON COMPANY, Waltham, MA (US)

(72) Inventors: Andrew Ralph Calvano, Draper, UT (US); Timothy Bryant, Indialantic, FL (US)

(73) Assignee: RAYTHEON COMPANY, Waltham, MA (US)

( * ) Notice: Subject to any disclaimer, the term of this patent is extended or adjusted under 35 U.S.C. 154(b) by 254 days.

(21) Appl. No.: 16/817,550

(22) Filed: Mar. 12, 2020

(65) Prior Publication Data

US 2021/0286600 A1   Sep. 16, 2021

(51) Int. Cl.
*G06F 8/41* (2018.01)
*G06F 11/36* (2006.01)
*G06F 8/75* (2018.01)
*G06F 16/24* (2019.01)

(52) U.S. Cl.
CPC .............. *G06F 8/437* (2013.01); *G06F 8/75* (2013.01); *G06F 11/3604* (2013.01); *G06F 16/24* (2019.01)

(58) Field of Classification Search
None
See application file for complete search history.

(56) References Cited

U.S. PATENT DOCUMENTS

| | | | | |
|---|---|---|---|---|
| 5,854,924 A * | 12/1998 | Rickel | ................ | G06F 11/3604 717/132 |
| 8,407,675 B1 * | 3/2013 | Clark | ................ | G06F 8/53 717/131 |
| 10,025,571 B1 * | 7/2018 | Boulos | ................ | G06F 8/437 |
| 2005/0028002 A1 * | 2/2005 | Christodorescu | ..... | G06F 21/562 726/3 |
| 2008/0178149 A1 * | 7/2008 | Peterson | ................ | G06F 8/443 717/110 |
| 2014/0173556 A1 * | 6/2014 | Robatmili | ................ | G06F 8/31 717/115 |
| 2015/0180883 A1 * | 6/2015 | Aktas | ................ | G06F 21/564 726/23 |
| 2017/0004303 A1 * | 1/2017 | Yan | ................ | G06F 21/562 |
| 2019/0354689 A1 * | 11/2019 | Li | ................ | G06N 3/04 |
| 2021/0056076 A1 * | 2/2021 | Yin | ................ | G06F 16/2237 |
| 2021/0132924 A1 * | 5/2021 | Kim | ................ | G06F 8/53 |

OTHER PUBLICATIONS

Hardekopf, Ben et al., "The Ant and the Grasshopper: Fast and Accurate Pointer Analysis for Millions of Lines of Code", PLDI'07, Jun. 11-13, 2007, San Diego, California, USA, 10 pages, ACM.
Singer, Jeremy, "Sparse Bidirectional Data Flow Analysis as a Basis for Type Inference", Feb. 13, 2004, 14 pages.

* cited by examiner

*Primary Examiner* — Jason D Mitchell
(74) *Attorney, Agent, or Firm* — Lewis Roca Rothgerber Christie LLP

(57) ABSTRACT

A system and method for function summarization. In some embodiments, the method includes: identifying a basic function called by a first function, the first function having a signature; determining a first type, the first type being a type of an argument of the basic function or a type of a return value of the basic function; and propagating the first type, to determine a first portion of the signature of the first function.

19 Claims, 2 Drawing Sheets

FUNCTION SUMMARIZATION VIA TYPE INFERENCE

FIELD

One or more aspects of embodiments according to the present invention relate to static analysis, and more particularly to a system and method for summarizing functions.

BACKGROUND

Static analysis of object code has a variety of commercial and military applications, including assessing whether a piece of object code includes malicious portions or vulnerabilities. In static analysis of object code, understanding the purpose or effect of a function may be challenging, in part because object code, especially if compiled without debug symbols, may lack features such as descriptive function names, descriptive variable names, and comments, that, in source code, for example, may facilitate the understanding of a function's purpose or effect.

Thus, there is a need for a system and method for summarizing functions in object code.

SUMMARY

According to an embodiment of the present invention, there is provided a method for function summarization, the method including: identifying a basic function called by a first function, the first function having a signature; determining a first type, the first type being a type of an argument of the basic function or a type of a return value of the basic function; and propagating the first type, to determine a first portion of the signature of the first function.

In some embodiments: the identifying of the basic function called by the first function includes identifying, from object code, the basic function called by the first function; and the propagating of the first type includes propagating the first type based on object code.

In some embodiments, the method further includes determining, based on the portion of the signature of the first function, a summary of the first function.

In some embodiments, the method includes determining the entire signature of the first function, the determining of the entire signature of the first function including the propagating of the first type, to determine the first portion of the signature of the first function.

In some embodiments, the method further includes determining, based on the entire signature of the first function, a summary of the first function, wherein the determining of the summary includes looking up the entire signature in a summarization database.

In some embodiments, the basic function is a library function.

In some embodiments, the first type is a type of an argument of the basic function.

In some embodiments, the method further includes: determining a second type, the second type being a type of a return variable of the basic function; and propagating the second type, to determine a second portion of the signature of the first function.

In some embodiments: the propagating of the first type includes propagating the first type backward, and the first portion of the signature includes a type of an argument of the first function.

In some embodiments: the propagating of the second type includes propagating the second type forward, and the second portion of the signature includes a type of a return value of the first function.

In some embodiments: the propagating of the first type further includes propagating the first type forward, and the first portion of the signature further includes a type of a return value of the first function.

In some embodiments: the propagating of the second type further includes propagating the first type backward, and the second portion of the signature further includes a type of an argument of the first function.

In some embodiments, the combination of the first portion of the signature and the second portion of the signature is the entire signature. In some embodiments, the first portion of the signature is the entire signature.

In some embodiments, the method further includes: identifying the first function as a function called by a second function; determining a second type, the second type being a type of an argument of the first function or a type of a return value of the first function; and propagating the second type, to determine a first portion of the signature of the second function.

In some embodiments, the method further includes determining, based on the portion of the signature of the second function, a summary of the second function.

In some embodiments, the method includes determining the entire signature of the second function, the determining of the entire signature of the second function including the propagating of the second type, to determine the first portion of the signature of the second function.

According to an embodiment of the present invention, there is provided a system for function summarization, the system including a processing circuit and a memory, the memory storing instructions that, when executed by the processing circuit, cause the processing circuit to: identify a basic function called by a first function, the first function having a signature; determine a first type, the first type being a type of an argument of the basic function or a type of a return value of the basic function; and propagate the first type, to determine a first portion of the signature of the first function.

In some embodiments: the identifying of the basic function called by the first function includes identifying, from object code, the basic function called by the first function; and the propagating of the first type includes propagating the first type based on object code.

In some embodiments, the system includes determining the entire signature of the first function; and further including determining the summary of the first function by looking up the entire signature in a summarization database, the determining of the entire signature of the first function including the propagating of the first type, to determine the first portion of the signature of the first function.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for summarizing functions provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
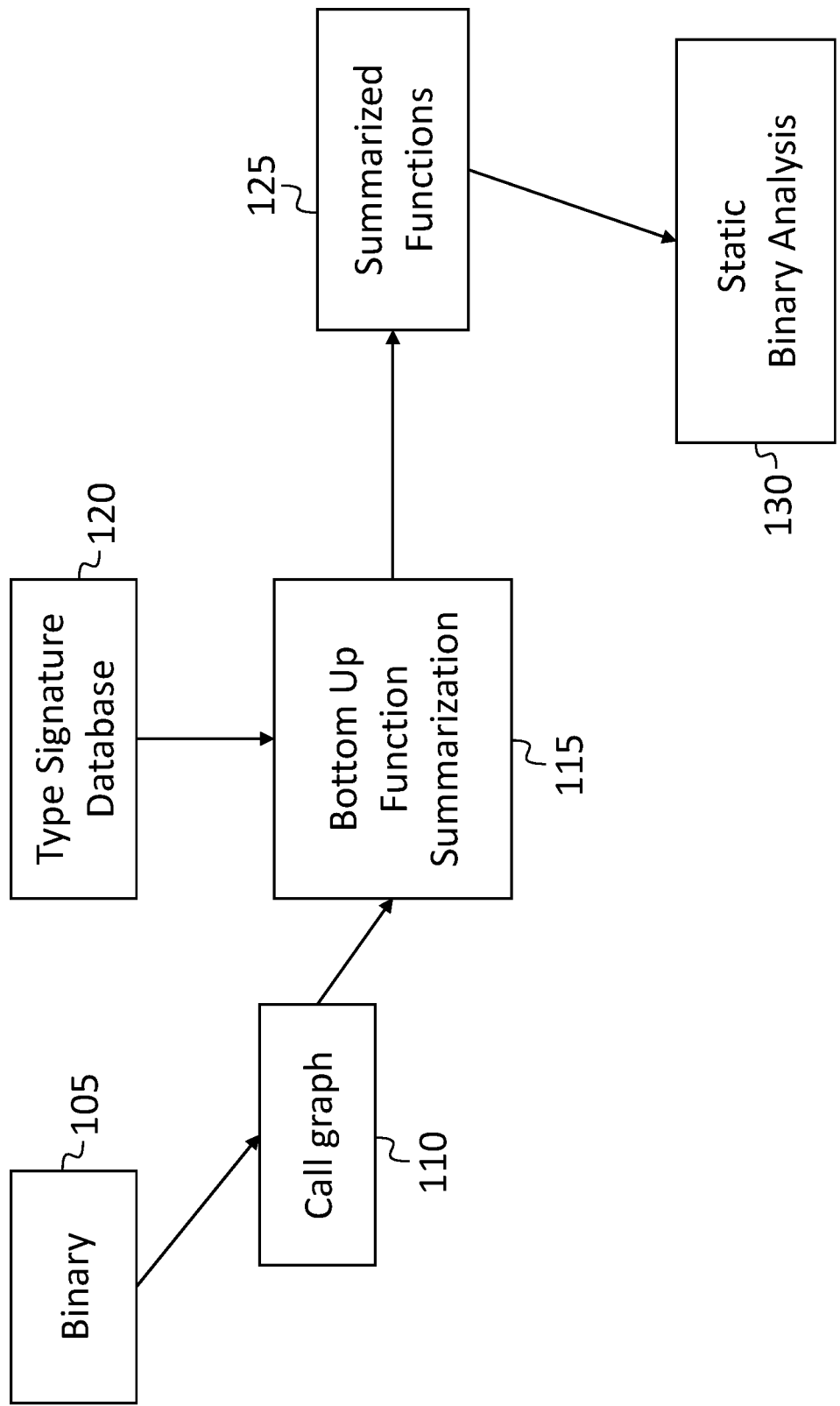
FIG. 1 is a hybrid block diagram and flow chart, according to an embodiment of the present invention.

In some embodiments, a static method for function summarization analyzes object code (e.g., code in a binary file) 105, identifies functions in the object code, and assigns summaries to the functions. A summary may be an object (e.g., a text string, or a collection of text strings and other data) that provides information regarding the purpose or effect of a function. For example, the summary of a function that calculates a square root may be (or include) the text string "Function for calculating a square root". As illustrated in FIG. 1, the method for function summarization may include forming, at 110, a call graph from the object code, and performing bottom-up function summarization, at 115, using a type signature database 120, discussed in further detail below. The method may result in a set of summarized functions 125, which may then be used, at 130, for further static analysis of the object code.

The process may proceed as follows. First, the object code being analyzed may be disassembled, e.g., by a commercial disassembler such as IDA PRO or Binary Ninja. The output of the disassembler may include a control flow graph, including one or more basic blocks, connected by edges. Each basic block may be a sequence of instructions that are executed in sequence. The edges of the control flow graph may encode possible control flow transfers. For example, a basic block may be terminated with a conditional jump, with the true edge flowing to one basic block and the false branch flowing to another. The disassembler may also create a call graph which represents the caller/callee relationships between functions.

Figure 2:
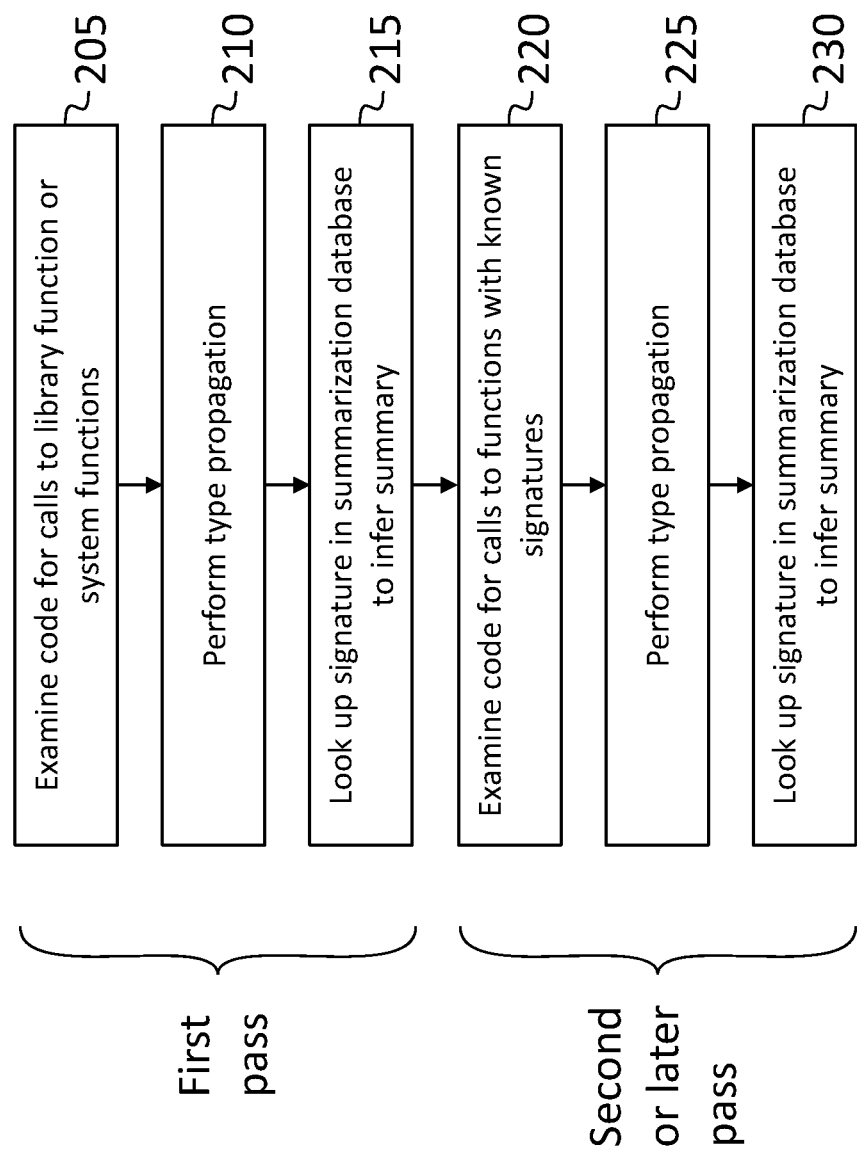
FIG. 2 is a flow chart, according to an embodiment of the present invention.

Referring to FIG. 2, each function in a piece of object code being analyzed may be examined, at 205, to determine whether it performs a call to a library function or to a system function. The signature of each library function and of each system function may be known, e.g., from documentation provided by the creators of the operating system or of the library. Such functions (that are part of the operating system or part of a library for which documentation is available) may be referred to herein as "basic" functions. As used herein, a "signature" is a tuple consisting of a type set for each function argument and a type set for each return value.

For each function that performs a call of a basic function, a summarization attempt is performed. During a summarization attempt a call graph of the function to be summarized is generated. The call graph has a root node corresponding to the function to be summarized, an additional node corresponding to each function called by the function to be summarized, and an edge, from the root node, to each of the additional nodes. It may have additional nodes and edges, and in general, the call graph may not be a tree. For example, if the function to be summarized is f( ), and it calls the function g( ) and the function h( ), and the function g( ) also calls the function h( ), then the call graph may have a first edge connecting f( ) to g( ), a second edge connecting g( ) to h( ), and a third edge connecting f( ) directly to g( ). The call graph may be converted to a context-sensitive call graph. A context-sensitive call graph may have a separate node for each call to a function from a different context, so that in this example, the context-sensitive call graph would contain two nodes for h( ), one connected directly to f( ) and one connected to f( ) via g( ), and this portion of the context-sensitive call graph would be a tree.

Once the context-sensitive call graph is created, the code may be converted to single static assignment (SSA) form, and a flow-sensitive points-to analysis may be performed over the code. The flow-sensitive points-to analysis computes points-to sets for each SSA register and abstract memory location at each program point. As used herein, an "SSA register" is an SSA version of the register; abstract memory locations are created for the analysis, since virtual memory addresses and physical memory addresses generally are not known in a static analysis. To perform the flow-sensitive points-to analysis, a set of flow definitions is created (before the analysis begins); these flow definitions specify propagation rules, usable by an automated analysis tool, that describe dataflow and pointer constraints for each machine code instruction. For example, "mov rax, rbx" on an x86_64 processor describes a propagation from the points-to set that rbx points to, to the points-to set that rax points to, and the flow definition for this instruction may capture this points-to propagation characteristic of the instruction. As another example, the flow definition for the instruction "mov rax, qword [rbx]" may specify that the points-to set of each value that rbx points to flows to the rax register. The result of the flow-sensitive points-to analysis is a points-to set for each register and memory location referenced in the program.

A dataflow graph encoding the define and use locations for each SSA register and abstract memory location may then be generated. A define location in this dataflow graph corresponds to the location in the program where the SSA register or abstract memory location was defined (or assigned), and each use location may correspond to where the SSA register or abstract memory location was used. A use location is connected to a definition location. A traversal over the data flow graph starting from a definition location may produce what is called a definition-usage chain. A definition-usage chain is the collection of definitions and usages for a given variable (register or memory location).

The dataflow graph may then be used to propagate types within the code, at 210. For example, if the function to be summarized, in calling a library function, passes a first variable as an argument to the library function, the type of the first variable may be inferred from the type that the library function requires for the argument it receives, which in turn may be inferred from the known signature of the library function. This kind of type propagation may be referred to as propagating the type "backward" because the type of the first variable, in the function to be summarized, is inferred, in this process, from a subsequent use of the first variable as an argument passed in to a library function. The type of this first variable may also be used to infer the types of other variables in the function to be summarized, using the dataflow graph. For example, if a second variable is defined to be equal to the first variable (i.e., the value of the first variable is assigned to the second variable), then the second variable may be inferred to have the same type as the first variable.

Similarly, if the function to be summarized, in calling a library function, receives a third variable as a return value from the library function, the type of the third variable, which is defined (i.e., assigned to) by the call to the library function, may be inferred from the type that the library function returns, which in turn may be inferred from the known signature of the library function. This kind of type propagation may be referred to as propagating the type "forward" because the type of the third variable, in the function to be summarized, is inferred, in this process, from a previously occurring definition of the third variable as a return value returned by a library function. As in the case of the first variable discussed above, the type of this third variable may also be used to infer the types of other variables in the function to be summarized, using the dataflow graph.

This type propagation may result in determining the type of one or more arguments or one or more return values of the function to be summarized, i.e., it may be that as a result of this analysis a portion of the signature (e.g., all of the signature) of the function to be summarized becomes known. As used herein, a "portion" of a thing means at least some of the thing, so that, for example, "a portion of the signature" means either (i) some, but not all, of the signature, i.e., a type set for each of some but not all of the function arguments and return values, or (ii) the entire signature.

A database (or "summarization database") of signatures and corresponding summaries may then be used, at 215, to summarize the function to be summarized, i.e., to associate a summary with the function to be summarized. This database also includes a summary for each type signature which describes how a function with the matched type signature should propagate type information to its arguments and return values.

Such a database may be constructed in various ways. For example, contributions to the database may be made by programmers writing functions, or by analysts analyzing previously written functions. In some circumstances software development or analysis teams not necessarily working together otherwise may make contributions to a shared database for each other's mutual benefit.

Once a first pass over the code has been completed, if it has resulted in a previously-unknown portion of a signature being determined for any functions in the piece of object code being analyzed, a second pass may result in further progress. In the second pass, summarization may be attempted not only for functions that call library functions or system functions but (at 220, 225, 230 in FIG. 2) for any function that calls any functions for which a portion of the signature is known. For example, if the function f( ) calls the function g( ) and the function h( ), if h( ) is a library function, and if the function g( ) also calls the function h( ), then on a first pass through the code it may be that the function g( ) is successfully summarized (based on its call to h( )), but that no part of the signature of f( ) is determined (e.g., because the call directly from f( ) to h( ) does not result in type information that propagates to arguments or return values of f( )), or that the portion of the signature of f( ) that is determined is not sufficient to identify a corresponding summary in the summarization database. In such a case, it may be that once the signature of g( ) is known (e.g., from the first pass), the type information about variables in f( ) that is inferred from its call to g( ) is sufficient, in the second pass, to make possible the summarization of f( ).

In some embodiments, therefore, repeated summarization attempt passes are made, with each pass potentially summarizing functions that were not summarized in the preceding pass, as a result of new information about signatures (e.g., new summaries) becoming available at the end of the previous pass. This approach to summarization may be referred to as a "bottom up" approach, because functions that call library functions or system functions directly may be summarized first, and functions that are "higher up" (e.g., in a call graph in which library functions and system functions are at the bottom) are summarized later, after non-library, non-system functions that they call have been summarized. In some embodiments the repeated summarization attempt passes are performed recursively, with an attempted summarization of a function to be summarized being implemented as follows: for every function called by the function to be summarized, (i) propagating any type information obtained if the called function is a system function or a library function and (ii) attempting to summarize the function if it is neither a system function nor a library function.

The code in Listing 1 may be used to illustrate the method, in some embodiments. In a first pass, the function read_n_bytes( ) (defined on lines 49-57) may be identified for summarization since it calls (on line 54) the library function "fread" (a system function with an entry in the summarization database). The "fread" function may have a type signature as follows:

Argument signature, Return Value signature
(file_data*, size_t, read_size, file_handle), (file_read_status)

It may also have a corresponding summary as follows:
fread
  $v'$=arg1
  $v'$: −file_data*
  $x'$=arg2
  $x'$: −size_t
  $y'$=arg3
  $y'$: −read_size
  $z'$=arg4
  $z'$: −file_handle
  $ret'$: ret1
  ret1: +file_read_status In the notation of the above summary, a colon represents a type constraint, and an equals sign represents an analysis constraint (symbols on the two sides of an equals sign must contain the same values). In the analysis of read_n_bytes, the call to fread( ) may be replaced with the above summary.

The method may then perform analysis to propagate the types backwards and forwards throughout the read_n_bytes function with the goal of tracking to the arguments and return value of read_n_bytes. This process may result in determining the following signature for the function read_n_bytes( ):

(file_handle, file_data*, read_size), (file_read_status)

This type signature may be looked up in the summarization database; if a match is found, then the associated summary may be used instead of the code for read_n_bytes( ) any time the function read_n_bytes( ) appears to be called in another function.

On a subsequent pass, the method may attempt to summarize the function main( ) In this process, calls to the function read_n_bytes( ) may be replaced with the summary for the function read_n_bytes( ) and analysis (e.g., type propagation) may be performed over main in the same way as it was for the function read_n_bytes( ) It is possible that the signature of main would not be found in the summarization database; in that case, the summarization procedure may end.

In some embodiments, function summarization is performed by analysis software, running on a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Listing 1

```
1   #include <stdio.h>
2   #include <stdlib.h>
3
4   int len(char *str){
5      int i = 0;
6      while (str[i] != '\0'){
7         i++;
8      }
9      return i;
10  }
11
12  int power(int base, int exp){
13     int result = base;
14     if (exp == 0)
15        return 1;
16     while (--exp){
17        result *= base;
18     }
19     return result;
20  }
21
22  int toi(char *num){
23     int index = 0;
24     int length = len(num);
25     int total = 0;
26
27     //verify digits are in decimal
28     //'0' == 0x30
29     while (length-X
30        total += (num[index++] - 0x30) * power(10, length);
31     }
32
33     return total;
34  }
35
36  int func0(int num1, int num2, int num3, int num4){
37     int result = 0;
38     int rem = 0;
39     result += (num1 * num3) + (num1 * num3) / 90;
40     rem = (num2 + num4) * num1 % num3;
41     return result;
42
43  }
44
45  void hasher(int *seed, int num1, int num2, int num3, int num4){
46     *seed *= func0(num1, num2, num3, num4);
47  }
48
49  int read_n_bytes(FILE *fh, char *dst, size_t size)
50  {
51     if (fh == NULL)
52        return -1;
53
54     int status = fread(dst, 1, size, fh);
55
56     return status;
57  }
58
```

Listing 1

```
59  int main(int argc, char* argv[]){
60     if (argc < 2) {
61        printf("Please provide file to read integers to hash from\n")
62        exit(0);
63     }
64
65     FILE *fh = fopen(argv[1], "r");
66
67     if (fh == NULL)
68     {
69        printf("Failed to open %s\n", argv[1]);
70        exit(0);
71     }
72
73     unsigned int num1 = 0;
74     read_n_bytes(fh, (char *) &num1, sizeof(unsigned int));
75
76     unsigned int num2 = 0;
77     read_n_bytes(fh, (char *) &num2, sizeof(unsigned int));
78
79     unsigned int num3 = 0;
80     read_n_bytes(fh, (char *) &num3, sizeof(unsigned int));
81
82     unsigned int num4 = 0;
83     read_n_bytes(fh, (char *) &num4, sizeof(unsigned int));
84
85     int seed1 = 403283185;
86     int seed2 = 68204721;
87     int seed3 = 57291167;
88     int seed4 = 198791279;
89
90     hasher(&seed1, num1, num2, num3, num4);
91     hasher(&seed2, num1, num2, num3, num4);
92     hasher(&seed3, num1, num2, num3, num4);
93     hasher(&seed4, num1, num2, num3, num4);
94
95     printf("%d%d%d%d\n", seed1, seed2, seed3, seed4);
96
97  }
```

As used herein, the word "or" is inclusive, so that, for example, "A or B" means any one of (i) A, (ii) B, and (iii) A and B. As used herein, when a first quantity is referred to as being "based on" a second quantity it means that the second quantity influences the first quantity, e.g., the second quantity may be an input (e.g., the only input, or one of several inputs) to a method that generates the first quantity.

Although limited embodiments of a system and method for summarizing functions have been specifically described and illustrated herein, many modifications and variations will be apparent to those skilled in the art. Accordingly, it is to be understood that a system and method for summarizing functions employed according to principles of this invention may be embodied other than as specifically described herein. The invention is also defined in the following claims, and equivalents thereof.

What is claimed is:

1. A method, performed by one or more processors, for function summarization in an object code to determine malicious portions or vulnerabilities in the object code, the method comprising:
   disassembling the object code by a disassembler software tool;
   identifying a first function from the object code, the first function to be summarized having a signature;
   analyzing the first function to determine whether the first function performs a call to a library function or to a system function;
   creating a call graph of the first function representing a caller/callee relationships between functions in the object code, wherein the call graph incudes a root node corresponding to the first function, a second node corresponding to each function called by the first function;

converting the code of the first function to a single static assignment (SSA) form;

computing points to sets and abstract memory locations for the SSA form;

creating a data flow graph encoding one or more basic blocks, connected by edges, wherein a define location in the dataflow graph corresponds to a location in the object code where the SSA form or abstract memory location was defined or assigned, and a use location corresponding to a location of the SSA form or an abstract memory location that was used;

traversing over the data flow graph starting from a define location to propagate types to determine a type of one or more arguments or one or more return values of the first function to be summarized and obtain a portion of the signature of the first function, wherein when the first function to be summarized, in calling a library function, passes a first variable as an argument to the library function, a type of the first variable is inferred from a type that the library function requires for the argument it receives, which is inferred from a known signature of the library function required for the argument it receives, which is inferred from a known signature of the library function, wherein the type of the first variable, in the first function is inferred from a subsequent use of the first variable as an argument passed to the library function, and wherein when the first function to be summarized, in calling a library function, receives a third variable as a return value from the library function, a type of the third variable, which is defined by the call to the library function, is inferred from a type that the library function returns, which is inferred from the known signature of the library function, wherein the type of the third variable, in the first function is inferred from a previously occurring definition of the third variable as a return value returned by a library function;

determining a summary of the first function, based on the portion of the signature of the first function; and executing a static analysis on the summary of the first function to determine malicious portions or vulnerabilities in the object code.

2. The method of claim 1, wherein the propagating of the first type comprises propagating the first type based on object code.

3. The method of claim 1, comprising determining the entire signature of the first function, the determining of the entire signature of the first function comprising the propagating of the first type, to determine the first portion of the signature of the first function.

4. The method of claim 3, further comprising determining, based on the entire signature of the first function, a summary of the first function, wherein the determining of the summary comprises looking up the entire signature in a summarization database.

5. The method of claim 1, wherein the basic function is a library function.

6. The method of claim 1, wherein the first type is a type of an argument of the basic function.

7. The method of claim 6, further comprising:
determining a second type, the second type being a type of a return variable of the basic function; and
propagating the second type, to determine a second portion of the signature of the first function.

8. The method of claim 7, wherein:
the propagating of the first type comprises propagating the first type backward, and
the first portion of the signature comprises a type of an argument of the first function.

9. The method of claim 7, wherein:
the propagating of the second type comprises propagating the second type forward, and
the second portion of the signature comprises a type of a return value of the first function.

10. The method of claim 9, wherein:
the propagating of the first type further comprises propagating the first type forward, and
the first portion of the signature further comprises a type of a return value of the first function.

11. The method of claim 10, wherein:
the propagating of the second type further comprises propagating the first type backward, and
the second portion of the signature further comprises a type of an argument of the first function.

12. The method of claim 10, wherein the combination of the first portion of the signature and the second portion of the signature is the entire signature.

13. The method of claim 1, wherein the first portion of the signature is the entire signature.

14. The method of claim 1, further comprising:
identifying the first function as a function called by a second function;
determining a second type, the second type being a type of an argument of the first function or a type of a return value of the first function; and
propagating the second type, to determine a first portion of the signature of the second function.

15. The method of claim 14, further comprising determining, based on the portion of the signature of the second function, a summary of the second function.

16. The method of claim 14, comprising determining the entire signature of the second function, the determining of the entire signature of the second function comprising the propagating of the second type, to determine the first portion of the signature of the second function.

17. A system for function summarization in an object code to determine malicious portions or vulnerabilities in the object code, the system comprising a processing circuit and a memory, the memory storing instructions that, when executed by the processing circuit, cause the processing circuit to:

disassemble the object code by a disassembler software tool;

identify first function from the object code, the first function to be summarized having a signature;

analyze the first function to determine whether the first function performs a call to a library function or to a system function;

create a call graph of the first function representing a caller/callee relationships between functions in the object code, wherein the call graph incudes a root node corresponding to the first function, a second node corresponding to each function called by the first function;

convert the code of the first function to a single static assignment (SSA) form;

compute points-to sets and abstract memory locations for the SSA form;

create a data flow graph encoding one or more basic blocks, connected by edges, wherein a define location in the dataflow graph corresponds to a location in the object code where the SSA form or abstract memory location was defined or assigned, and a use location corresponding to a location of the SSA form or an abstract memory location that was used;

traverse over the data flow graph starting from a define location to propagate types to determine a type of one or more arguments or one or more return values of the first function to be summarized and obtain a portion of the signature of the first function, wherein when the first function to be summarized, in calling a library function, passes a first variable as an argument to the library function, a type of the first variable is inferred from a type that the library function requires for the argument it receives, which is inferred from a known signature of the library function required for the argument it receives, which is inferred from a known signature of the library function, wherein the type of the first variable, in the first function is inferred from a subsequent use of the first variable as an argument passed to the library function, and wherein when the first function to be summarized, in calling a library function, receives a third variable as a return value from the library function, a type of the third variable, which is defined by the call to the library function, is inferred from a type that the library function returns, which is inferred from the known signature of the library function, wherein the type of the third variable, in the first function is inferred from a previously occurring definition of the third variable as a return value returned by a library function;

determine a summary of the first function, based on the portion of the signature of the first function; and execute a static analysis on the summary of the first function to determine malicious portions or vulnerabilities in the object code.

18. The system of claim 17, wherein the propagating of the first type comprises propagating the first type based on object code.

19. The system of claim 18, comprising determining the entire signature of the first function; and further comprising determining the summary of the first function by looking up the entire signature in a summarization database, the determining of the entire signature of the first function comprising the propagating of the first type, to determine the first portion of the signature of the first function.

* * * * *